United States Patent [19]

Pollock et al.

[11] Patent Number: 5,429,423
[45] Date of Patent: Jul. 4, 1995

[54] FABRICATED FRONT AXLE I-BEAM

[75] Inventors: Paul Pollock; Dick Ryan; Dennis Mahoney, all of Ft. Wayne, Ind.

[73] Assignee: Dana Corporation, Toledo, Ohio

[21] Appl. No.: 178,888

[22] Filed: Jan. 7, 1994

[51] Int. Cl.⁶ .................................................. B60B 35/08
[52] U.S. Cl. .................................. 301/124.1; 301/127
[58] Field of Search .................... 301/124.1, 127, 128, 301/129, 130, 137

[56] References Cited

U.S. PATENT DOCUMENTS

| | | |
|---|---|---|
| 815,583 | 3/1906 | Einfeldt ............... 301/124.1 |
| 817,881 | 4/1906 | Smith .................. 301/124.1 |
| 1,200,305 | 10/1916 | Brush . |
| 1,209,134 | 12/1916 | Dodge et al. ......... 301/137 X |
| 1,219,153 | 3/1917 | Reissner .............. 301/124.1 |
| 1,721,695 | 7/1929 | Hufferd et al. . |
| 1,841,735 | 1/1932 | Hufferd et al. . |
| 1,899,347 | 2/1933 | Mogford et al. . |
| 2,044,389 | 6/1936 | Kay ....................... 301/124.1 |
| 2,148,714 | 2/1939 | Urschell . |
| 2,685,479 | 8/1954 | Buckendale . |
| 2,911,262 | 11/1959 | Franck .................. 301/124.1 |

FOREIGN PATENT DOCUMENTS 1555320  10/1970  Germany .................. 301/128

Primary Examiner—Russell D. Stormer
Attorney, Agent, or Firm—Oldham, Oldham & Wilson Co.

[57] ABSTRACT

A non-driven tubular vehicle axle assembly in which the axle body is formed from the mating of opposing axle sections constructed of sheet material formed into channel members. The utilization of channel members of differing lengths combined in the construction of the axle body along with separately formed spring pads and knuckle/king pin mountings provides for ease of assembly of axles of various length and specification.

20 Claims, 5 Drawing Sheets

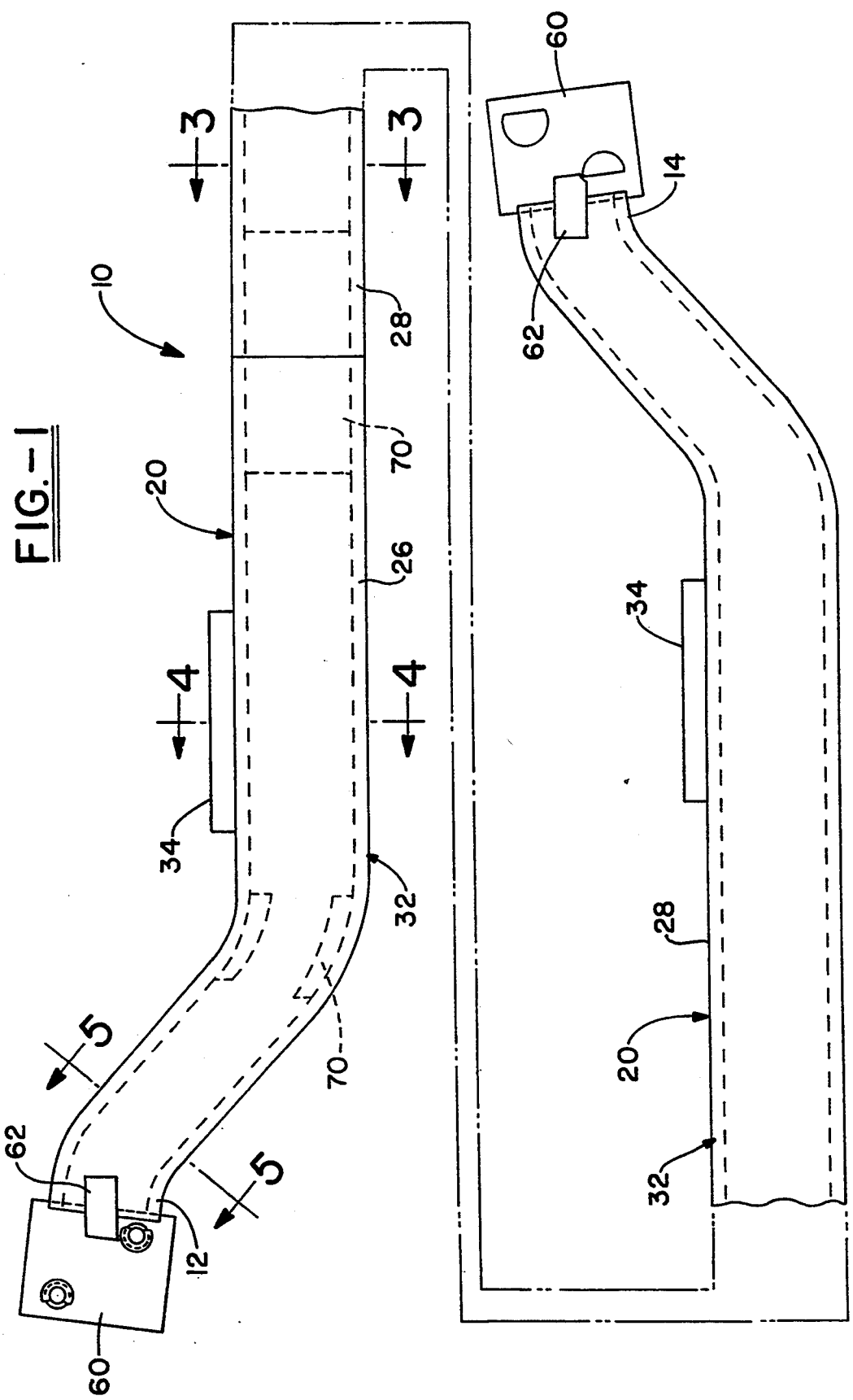

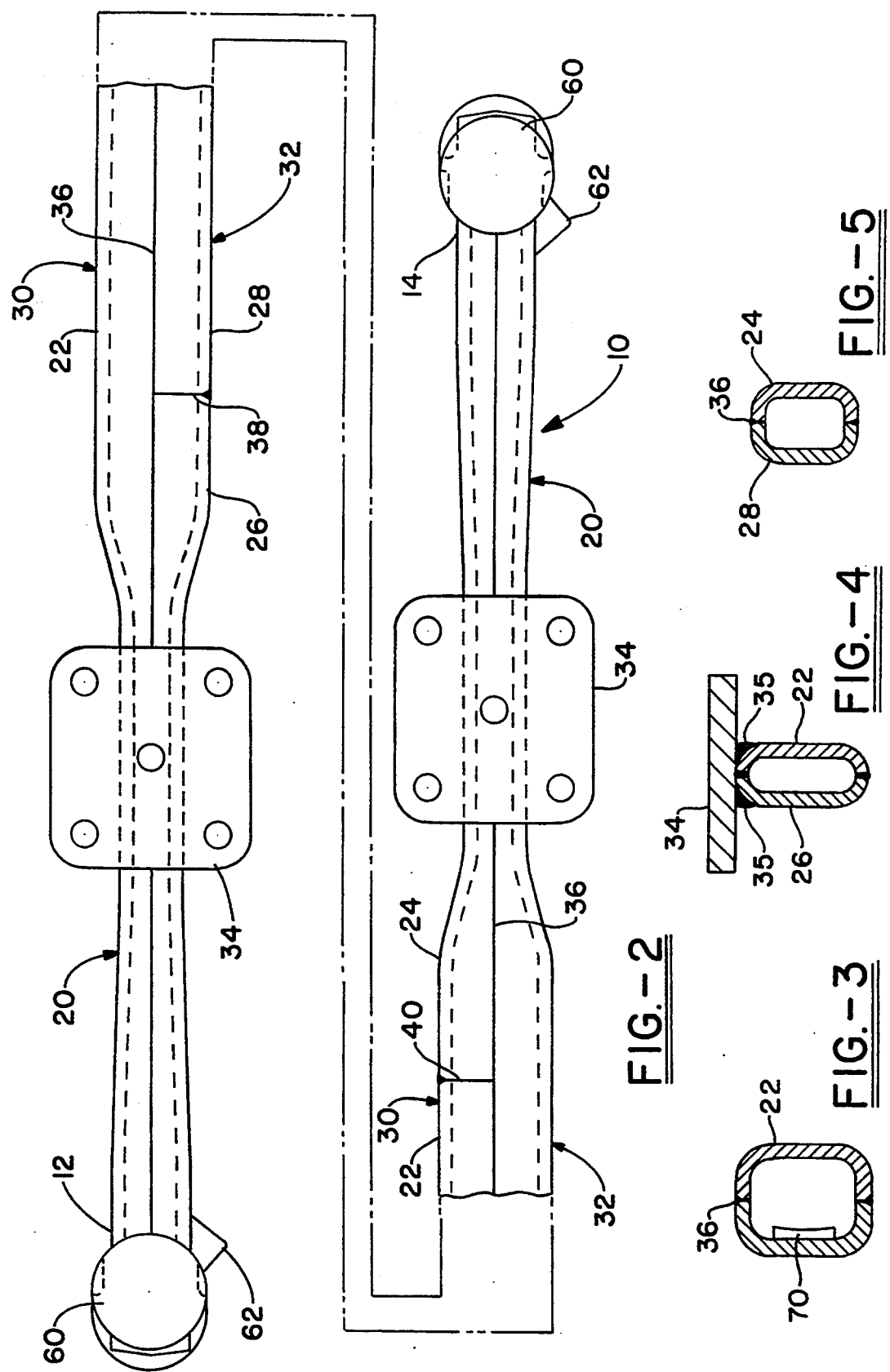

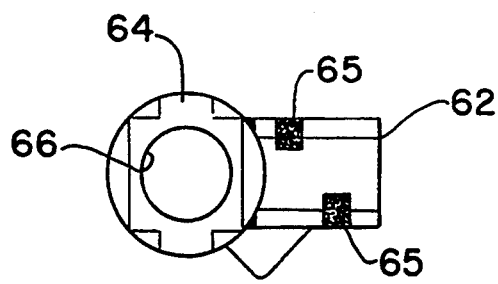
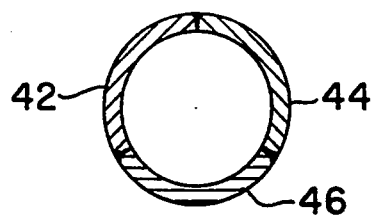
FIG.-6  FIG.-7
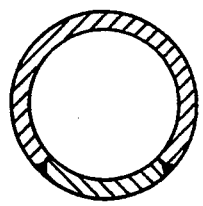 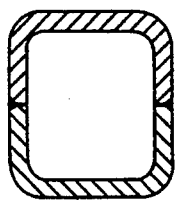 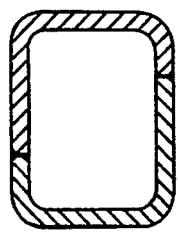 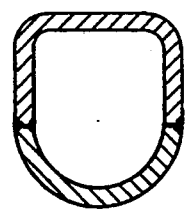
FIG.-8   FIG.-9   FIG.-10   FIG.-11
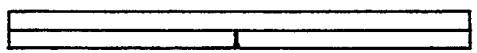
FIG.-12
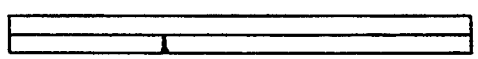
FIG.-13
FIG.-14
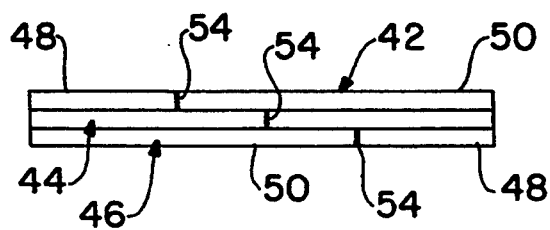
FIG.-15

FABRICATED FRONT AXLE I-BEAM

FIELD OF THE INVENTION

This invention relates generally to a vehicle axle assembly and more specifically to a tubular non-driven axle assembly in which long and short plates formed into channels are horizontally welded to form the axle body, having staggered vertical welds.

BACKGROUND OF THE INVENTION

The formation of tubular front and/or non-driven axles is known in the prior art. This type of axle provides exceptional strength from a lightweight construction and offers superior resistance to brake torque. Traditionally the tubular body was constructed from a single seamless tubular member or from a pair of mating open channel pieces die-pressed from sheet stock and joined by a longitudinal or horizontal weld. In the known prior art, the opposing horizontal welds were oriented in either a top to bottom or side to side relationship. Many of the axle assemblies of this type found in the prior art have tongues integrally formed in the outer portions of these channels to receive a king pin/knuckle assembly. All of the axle assemblies as shown in the prior art have the disadvantage of not being readily adaptable to adjustments in the length of the axle body as is now capable with the present invention. Based on the deficiencies of the prior art, applicants' invention is herein presented.

SUMMARY OF THE INVENTION

The present invention relates to a tubular non-driven vehicle axle assembly comprising a plurality of plates formed into open channels, at least one plate having a length shorter than another, said plates being joined using a horizontal weld to form a closed axle body; horizontally adjacent plates being joined by means of a vertical weld, said vertical weld being offset from the vertical weld of a pair of opposing plates. This axle assembly of the present invention has the advantage of being essentially modular and readily adaptable to adjustments in the length of the axle body without compromising strength of the assembly as could be expected from a circumferential vertical weld.

BRIEF DESCRIPTION OF THE DRAWINGS

FIG. 1 is a front elevational view of the front axle assembly of the present invention.

FIG. 2 is a top plan view of the front axle assembly illustrated in FIG. 1.

FIG. 3 is a transverse cross-sectional view of the front axle assembly of FIG. 1 taken along line 3—3.

FIG. 4 is a transverse cross-sectional view of the front axle assembly of FIG. 1 taken along line 4—4.

FIG. 5 is a transverse cross-sectional view of the front axle assembly of FIG. 1 taken along line 5—5.

FIG. 6 is a top plan view of the king pin mounting unit portion of the axle assembly attached to an end of the tubular axle body.

FIGS. 7–11 are transverse cross-sectional views of alternative embodiments of a front axle assembly of the present invention.

FIGS. 12–15 are diagrammatic front views illustrating alternative embodiments of a front axle assembly of the present invention opened along a horizontal weld to bring all sides into view.

FIG. 18 is a transverse cross-sectional view of the front axle assembly illustrated in FIG. 16, taken through the axle and spring pad.

FIG. 19 is a top plan view of the king pin mounting portion of the axle assembly attached to an end of the tubular axle body illustrated in FIGS. 16–17.

DESCRIPTION OF THE PREFERRED EMBODIMENT

Figure 16:
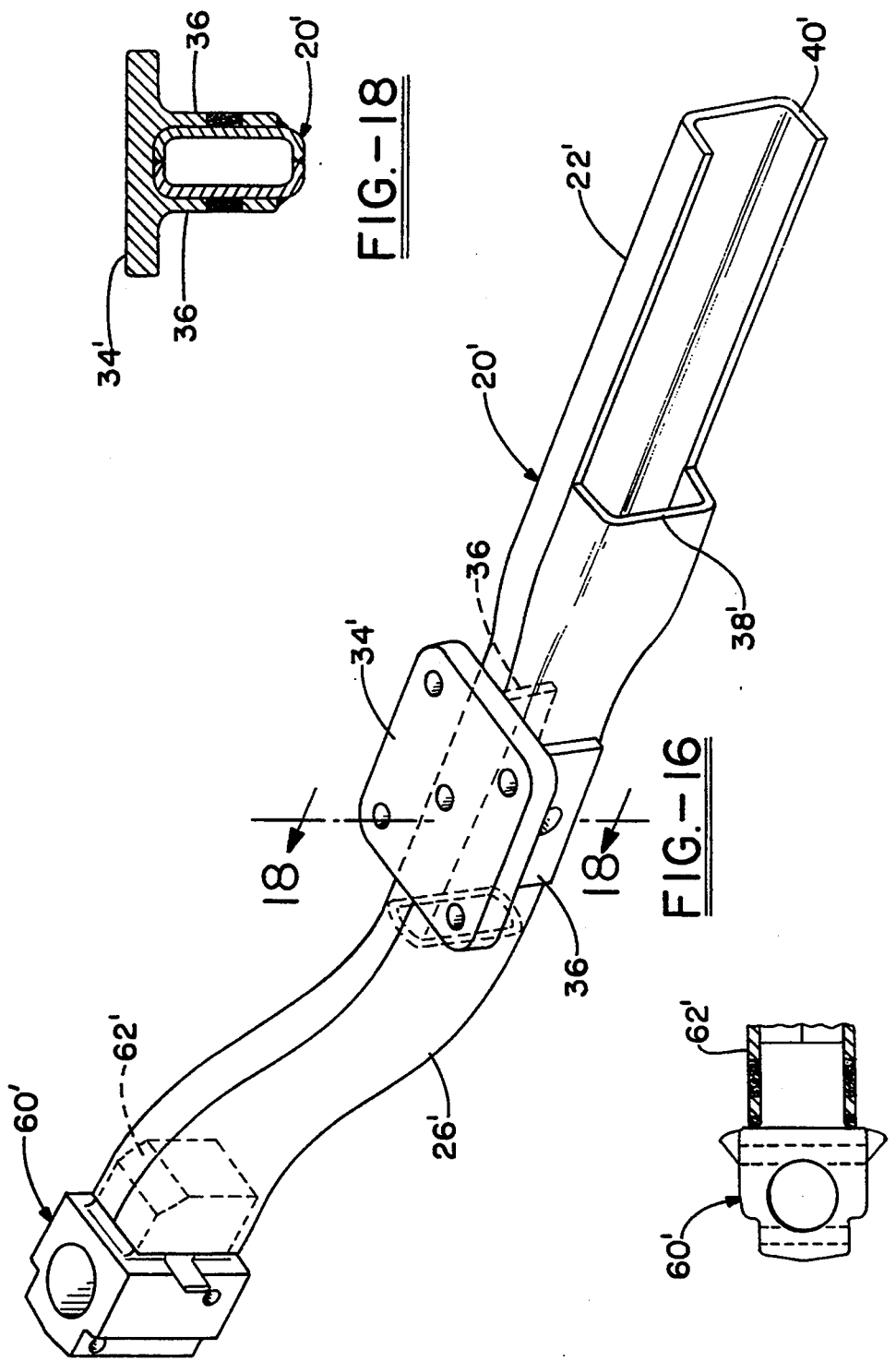
FIG. 16 is an enlarged isometric view of an embodiment for a front axle assembly of the present invention.

Referring now to the drawings and specifically to FIG. 1, a front vehicle axle assembly 10 is shown having a tubular axle body, generally 20, formed from a plurality of open channel members 22, 24, 26 and 28, best illustrated in FIG. 2. The channel members mate to form a circumferentially closed I-Beam axle assembly. The open channel members 22, 24, 26 and 28 can be formed using a variety of methods but are preferably constructed by rolling or pressing a sheet of metal into a mold or die. Cooperating channel members 22 and 24 are longitudinally aligned end to end to create a first axle body section 30 and likewise channel members 26 and 28 are longitudinally aligned to create a second axle body section 32. The cross section of the channel members may be of any desired shape as illustrated in, but not limited to, FIGS. 4–5 and 7–11, provided the same can be mated with opposing channel members to form a closed axle body.

Axle body sections 30 and 32 are mated together with the longitudinal edges of the channel members in abutting relation and welded or otherwise joined as indicated at 36.

Cooperating channel members such as those illustrated at 22 and 24 forming first axle body section 30 and channel members 26 and 28 forming second axle body section 32, are joined by means of vertical welds as indicated at 38 and 40. However, at least one channel member of either axle body section 30 or 32 differs in length from at least one other channel member so that the vertical welds (38, 40) of the two axle sections are offset from one another. It is important to the strength of the axle body of the present invention that the combination of one or more vertical welds does not completely circumscribe the axle body at the same cross-section.

Preferably, as in FIGS. 1 and 2, axle body sections 30 and 32 are each composed of one long channel member (22, 28) and one short channel member (24, 26). When the axle body sections are mated to form the closed axle body, vertical welds 38 and 40 as previously discussed, are offset from one another. In this embodiment, vertical welds are also offset of the body's center point.

Spring pads 34 (see FIG. 4) are plates premachined independently of the axle body 20 and can be welded or otherwise attached at any point along the length of the axle body 20 as required by the specifications of a given axle assembly, serving as a platform upon which the lower portion of a conventional spring (not shown) rests. A saddle weld, as at 35, can optionally be made a part of spring pad 34, essentially straddling axle body 20 and aiding in the attachment of spring pad 34 thereto.

The terminal ends (12, 14) of axle body 20 are open to receive a knuckle/king pin mounting 60 as shown in FIG. 6. Mounting 60 has a shank 62 and a receiving portion 64. Mounting 60 is preferably cast or forged independently of the axle body 20 and machined, as necessary, prior to assembly of the axle. Receiving portion 64 of mounting 60 is adapted or machined with an eye or bore 66 to receive a king pin (not shown). Terminal ends (12, 14) of the axle body 10 receive shank 62 of mounting 60 therein for subsequent permanent attachment by welding or other conventional means. Terminal ends 12 and 14 are :modified as to wall thickness and cross-sectional shape and the like in order to accommodate shank 62 as specifications require.

In the preferred embodiments, the sheet metal material, forming the channel members such as 22, 24, 26 and 28, is pressed around shank 62 of mountings 60, with the mountings thereafter conventionally welded in place. Additional plug welds 65, passing through a terminal end (12, 14) and into shank 62 are contemplated, if desired, to lend further strength to the assembly.

It is to be appreciated that the axle assembly of the present invention can be constructed from an axle body of various cross-section or having any number of axle body sections, FIGS. 7–11 being illustrated of currently preferred embodiments. FIGS. 12–15 schematically illustrate alternative embodiments of the front axle assembly of the present invention which utilize at least three channel members combined to forming sections of an axle body. In each instance no vertical weld circumscribes the entire axle body at one point on the longitudinal axis.

As shown specifically in FIG. 7 and also in FIG. 15, an axle body made according to the teachings of the present invention consists of multiple axle body sections. In this embodiment, each axle body section 42, 44 and 46 is constructed from two channel members. Axle body section 44 is constructed from two channel members of approximately equal length. Axle body sections 42 and 46 are each constructed from one long (50) and one short (48) channel member. All of the vertical welds 54 which join channel members to form an axle body section are offset from one another. It is possible, although less desirable, that two vertical welds 54 could be located adjacent one another provided that the completed axle body 10 does not have vertical welds which go around its entire circumference at the same location. In order that the axle body of the present invention has sufficient strength to withstand the forces it is subjected to, the axle body must not have vertical welds around at least approximately 90 degrees of a given circumference must not be welded. In other words, an axle body should not exceed more than approximately 270 degrees of vertical weld at any given location along the longitudinal axis.

Areas of the axle body 10 subjected to additional stress such as the bends or vertical welds are reinforced, when necessary, by the welding of plates 70 or gussets (not shown) on the interior surface of an axle body section, as shown in FIGS. 1 & 3.

The modular nature of the axle assembly of the present invention and the use of channel members of differing lengths allows not only the offsetting of vertical welds but permits assembly of axles having differing king pin center to center dimensions by simply changing the lengths of the channel members or altering the length of the straight portion of a channel member during its formation. The elimination of a vertical weld around the entire circumference of the axle body at any single location through the use of two or more offset vertical welds constructed around arcs partially circumscribing the axle body provides the capability to make axle assemblies of varying lengths from a single assembly set-up without compromising the overall strength of the axle. Further, king pin mountings and spring pads may be substituted as product specifications require.

Figure 17:
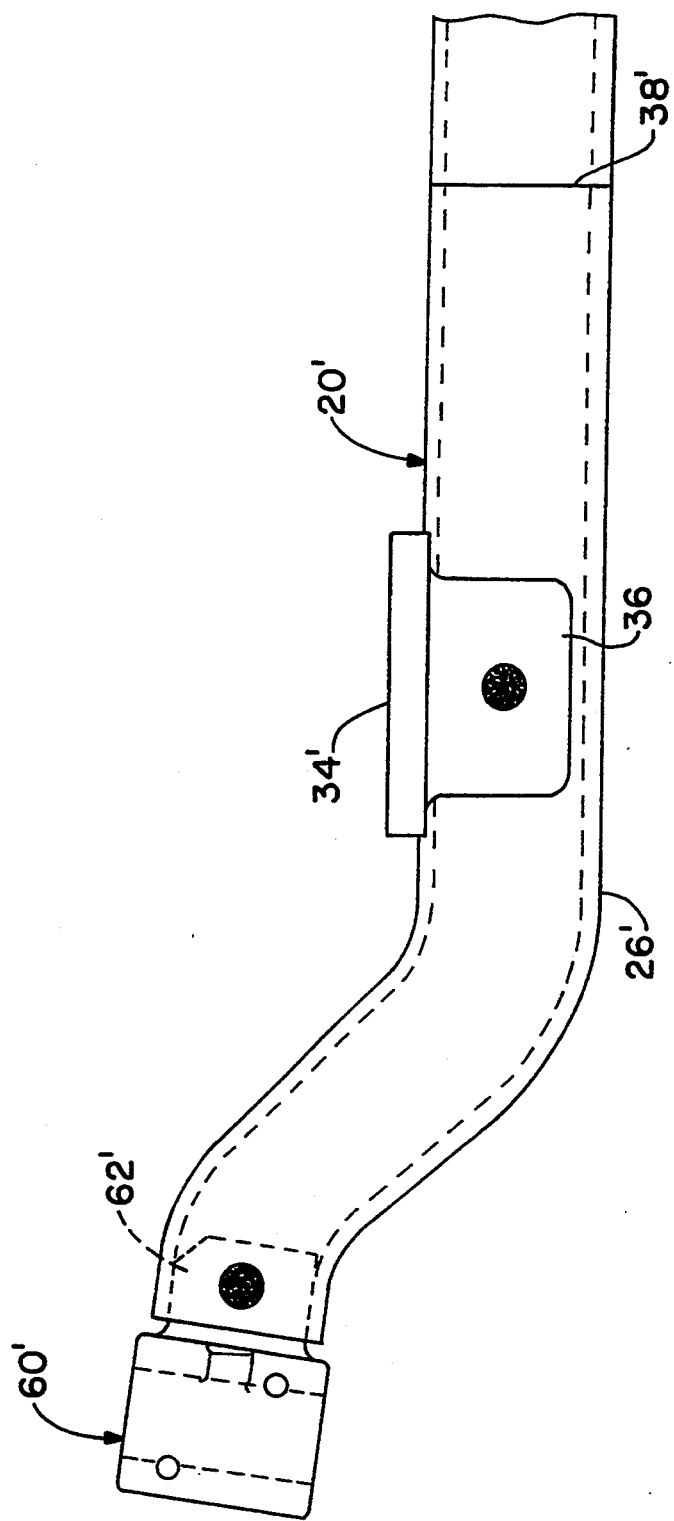
FIG. 17 is an enlarged front elevational view of the side of the front axle assembly illustrated in FIG. 16.

FIGS. 16–19 illustrate one side of a further embodiment of a front axle assembly of the present invention substantially similar to that shown in FIG. 1. Long channel member 22' and short member 26' are shown as mated together with the longitudinal edges of the channel members in abutting relation. Similarly, one long and one short channel member comprise the opposing side of the axle body, vertical welding occurring at sites 38' and 40'. A mounting 60', similar in construction to mounting 60 of FIG. 1, is attached at each end of an axle body, as previously explained. In this embodiment, spring pad 34', includes a saddle brace 36 consisting of two substantially parallel walls extending perpendicular to spring pad 34' for straddling axle body 20'. Saddle brace 36 may be formed integrally or independently from spring pad 34' and attached to axle body 20' by means known in the art, such as welding.

While in accordance with the patent statutes, a preferred embodiment and best mode have been presented, the scope of the invention is not limited thereto, but rather is measured by the scope of the appended claims.

What is claimed is:

1. A tubular vehicle axle assembly comprising:
   a first axle body section formed from at least one elongated first channel member, said first axle body section having an opening along its longitudinal axis and peripheral edges along both sides of said opening;
   a second axle body section formed from at least two elongated second channel members, each channel member having two ends, one end of one said second channel member secured to one end of the other said second channel member by a vertical securing means such that said second channel members share a common longitudinal axis, said second axle body section having an opening along its longitudinal axis and peripheral edges along both sides of said opening;
   said peripheral edges of at least said first and second axle body sections joined to said peripheral edges of an adjacent axle body by a horizontal securing means to form a cross-sectionally closed tubular axle body.

2. A tubular vehicle axle assembly as recited in claim 1 wherein one of said second channel members has a greater length than at least one other said second channel member.

3. A tubular vehicle axle assembly as recited in claim 1 wherein said first and second axle body sections each comprise two channel members of differing lengths, said channel members of each axle body section joined by a vertical securing means.

4. A tubular vehicle axle assembly as recited in claim 3 wherein the vertical securing means of said first axle body section is axially offset from the vertical securing means of said second axle body section.

5. A tubular vehicle axle assembly as recited in claim 4 wherein the vertical securing means of said first and second axle body sections are axially offset on opposite sides of an axial midpoint on said axle body.

6. A tubular vehicle axle assembly as recited in claim 1 wherein said axle assembly further comprises a third axle body section composed of at least two third channel members each having two ends, one end of one said third channel members secured to one end of the other said third channel member by a vertical securing means such that said second channel members share a common longitudinal axis, said second axle body section having an opening along its longitudinal axis and peripheral edges along both sides of said opening.

7. A tubular vehicle assembly as recited in claim 6 wherein at least one said vertical means is axially offset from a second said vertical securing means.

8. A tubular vehicle assembly as recited in claim 1 wherein said vertical securing means is a weld.

9. A tubular vehicle assembly as recited in claim 1 wherein said horizontal securing means is a weld.

10. A tubular vehicle axle assembly comprising:
- a first axle body section formed from at least one elongated first channel member, said first axle body section having an opening along its longitudinal axis and peripheral edges along both sides of said opening;
- a second axle body section formed from at least two elongated second channel members, each channel member having two ends, one end of one said second channel member secured to one end of the other said second channel member by a vertical securing means such that said second channel members share a common longitudinal axis, said second axle body section having an opening along its longitudinal axis and peripheral edges along both sides of said opening;
- said peripheral edges of at least said first and second axle body sections joined to said peripheral edges of an adjacent axle body by a horizontal securing means to form a cross-sectionally closed tubular axle body;
- a plurality of spring pads secured to said tubular axle body; and
- a pair of mounting members adapted to receive vehicle king pin or knuckle assemblies.

11. A tubular vehicle axle assembly as recited in claim 10 wherein each said mounting member has a receiving portion and a shank, said shank suited for insertion and attachment into a terminal end of said closed axle assembly.

12. A tubular vehicle axle assembly as recited in claim 11 wherein said receiving portion of said mounting member has a bore therethrough for receiving a king pin member.

13. A tubular vehicle axle assembly as recited in claim 10 wherein one of said second channel members has a greater length than at least one other said second channel member.

14. A tubular vehicle axle assembly as recited in claim 10 wherein said first and second axle body sections each comprise two channel members of differing lengths, said channel members of each axle body section joined by a vertical securing means.

15. A tubular vehicle axle assembly as recited in claim 10 wherein the vertical securing means of said first axle body section is axially offset from the vertical securing means of said second axle body section.

16. A tubular vehicle axle assembly as recited in claim 15 Wherein the vertical securing means of said first and second axle body sections are axially offset on opposite sides of an axial midpoint on said axle body.

17. A tubular vehicle axle assembly as recited in claim 10 wherein said axle assembly further comprises a third axle body section composed of at least two third channel members each having two ends, one end of one said third channel members secured to one end of the other said third channel member by a vertical securing means such that said second channel members share a common longitudinal axis, said second axle body section having an opening along its longitudinal axis and peripheral edges along both sides of said opening.

18. A tubular vehicle assembly as recited in claim 17 wherein at least one said vertical means is axially offset from a second said vertical securing means.

19. A tubular vehicle assembly as recited in claim 10 wherein said vertical securing means is a weld.

20. A tubular vehicle assembly as recited in claim 10 wherein said horizontal securing means is a weld.

* * * * *